(12) United States Patent
Al-Mehthel et al.

(10) Patent No.: US 9,796,624 B1
(45) Date of Patent: Oct. 24, 2017

(54) FOAM CONCRETE WITH OIL ASH

(71) Applicants: Saudi Arabian Oil Company, Dhahran (SA); King Fahd University of Petroleum and Minerals, Dhahran (SA)

(72) Inventors: Mohammed Heshan Al-Mehthel, Dhahran (SA); Mohammed Maslehuddin, Dhahran (SA); Saleh H. Al-Idi, Dhahran (SA); Mohammed Ibrahim, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/420,557

(22) Filed: Jan. 31, 2017

(51) Int. Cl.
C04B 18/06 (2006.01)
C04B 28/04 (2006.01)
C04B 14/02 (2006.01)
C04B 38/10 (2006.01)

(52) U.S. Cl.
CPC ............... *C04B 18/06* (2013.01); *C04B 14/02* (2013.01); *C04B 28/04* (2013.01); *C04B 38/10* (2013.01); *C04B 2201/30* (2013.01)

(58) Field of Classification Search
CPC ......... C04B 18/06; C04B 28/04; C04B 14/02; C04B 38/10; C04B 2201/30
See application file for complete search history.

(56) References Cited

U.S. PATENT DOCUMENTS

| | | | |
|---|---|---|---|
| 4,613,374 A | 9/1986 | Smith | |
| 8,444,761 B2 | 5/2013 | Al-Mehthel et al. | |
| 8,945,300 B2 | 2/2015 | Al-Mehthel et al. | |
| 9,150,455 B2 | 10/2015 | Al-Mehthel et al. | |
| 9,266,776 B2 | 2/2016 | Al-Mehthel et al. | |
| 2010/0064622 A1 | 3/2010 | Kutlu | |
| 2013/0104779 A1* | 5/2013 | Al-Mehthel | C04B 28/04 106/709 |
| 2013/0118382 A1* | 5/2013 | Al-Mehthel | C04B 28/02 106/705 |
| 2015/0122148 A1 | 5/2015 | Wahhab et al. | |
| 2015/0368156 A1* | 12/2015 | Al-Mehthel | C04B 28/02 106/705 |

FOREIGN PATENT DOCUMENTS

| | | |
|---|---|---|
| CN | 103359997 A | 10/2013 |
| IT | 1237347 B | 5/1993 |
| JP | H069251 A | 1/1994 |
| KR | 20060104518 A | 10/2006 |
| KR | 100884355 B1 | 2/2009 |
| KR | 101296589 B1 | 8/2013 |
| KR | 101513897 B1 | 4/2015 |

OTHER PUBLICATIONS

Derwent-Acc-No. 2005-128618, abstract of Korean Patent Specification No. KR 2004082094 A (Sep. 2004).*
Derwent-Acc-No. 2009-G52029, abstract of Korean Patent Specification No. KR 884355 B1 (Feb. 2009).*
Derwent-Acc-No. 2010-D18668, abstract of Korean Patent Specification No. 2010024537 A (Mar. 2010).*

* cited by examiner

*Primary Examiner* — Anthony J Green
(74) *Attorney, Agent, or Firm* — Bracewell LLP; Contance Gall Rhebergen

(57) ABSTRACT

A foam concrete has constituents that include a cement, a sand, a coarse aggregate, an oil ash, a water, and a foam solution. The foam concrete has a compressive strength of at least 20 MPa, a thermal conductivity of less than 0.41 W/mK and a maximum weight of 1650 kg/m³.

20 Claims, 1 Drawing Sheet

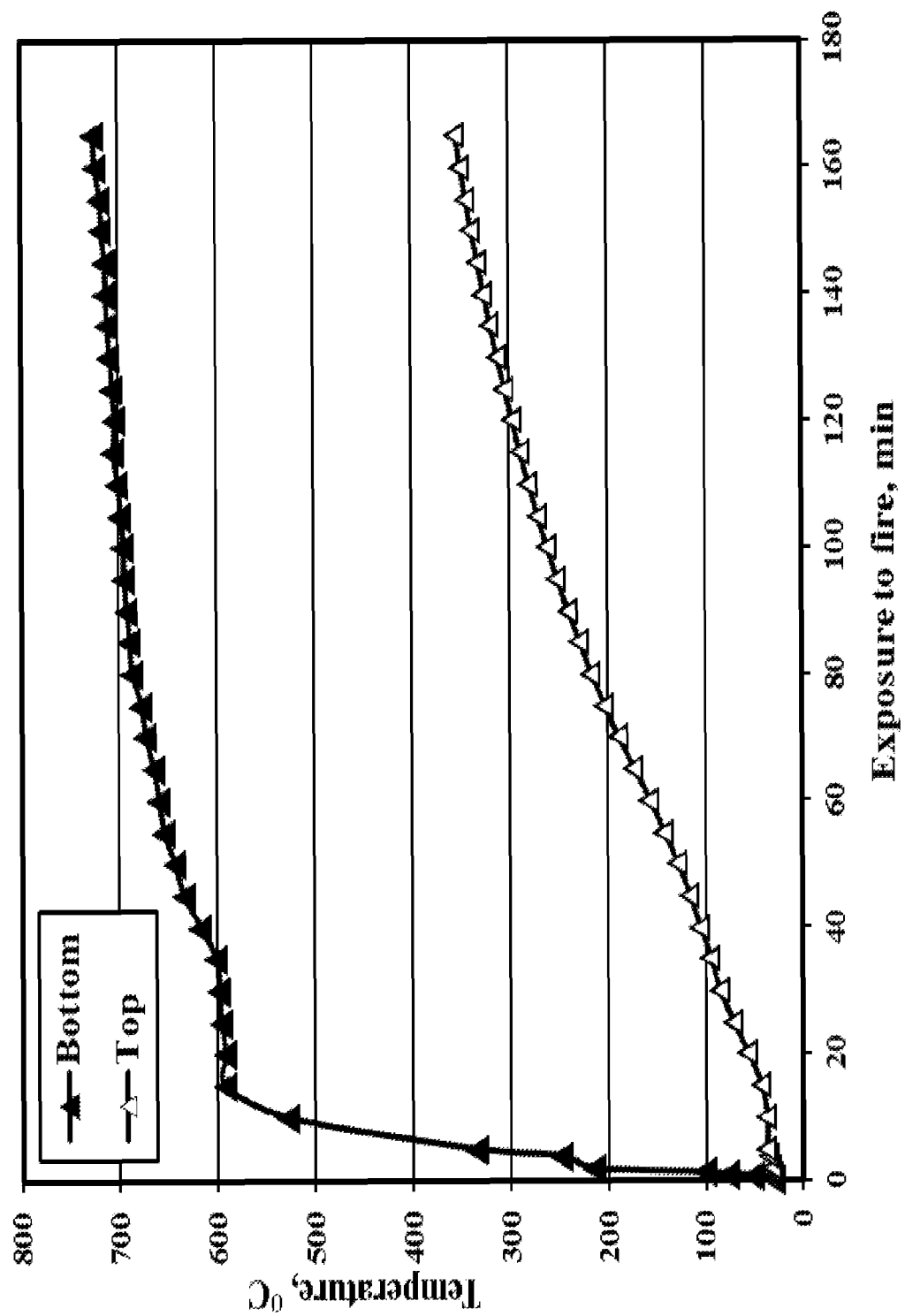

FOAM CONCRETE WITH OIL ASH

BACKGROUND OF THE DISCLOSURE

Field of the Disclosure

The present disclosure relates to a foam concrete with oil ash. More specifically, the disclosure relates to a lightweight concrete composition having oil ash as filler and methods for making the same.

Description of the Related Art

Concrete can be used for various construction purposes. Some current lightweight concrete has a low compressive strength and therefore cannot be used in concrete applications that are load bearing, such as structural members. In order to provide sufficient compressive strength, a higher weight concrete, such as a conventional concrete, can be used for load bearing concrete members. However, conventional concrete has higher thermal conductivity and higher weight and using a higher weight concrete or a greater amount of concrete can result in a heavy or bulky structure.

SUMMARY OF THE DISCLOSURE

Embodiments of this disclosure provide a lightweight foam concrete that has a lower thermal conductivity than some conventional normal weight concrete and provides a greater compressive strength than the current lightweight concrete. Compositions and methods described herein provide a foam concrete that can be used to prepare slender structural components and the decrease in the size of the structural components compared to some current concretes decreases the overall cost of a structure. The compressive strength of the disclosed foam concrete is high enough to allow the foam concrete to be used for structural purposes as well as for masonry units, bricks, and insulating materials. Further, the thermal conductivity of the developed composition is lower than that of the conventional concrete and some current lightweight concrete. Compositions and methods described herein utilize oil ash as a filler.

In an embodiment of the disclosure, a foam concrete has constituents that include a cement, a sand, a coarse aggregate, an oil ash, a water, and a foam solution. The foam concrete has a compressive strength of at least 20 MPa, a thermal conductivity of less than 0.41 W/mK, and a maximum weight of 1650 kg/m$^3$.

In alternate embodiments the cement and the water together can comprise 75 wt % to 80 wt % of the constituents of the foam concrete, based on the weight of the foam concrete. The foam concrete can be free of fly ash, plasticizers and fiber. The compressive strength of the foam concrete can be in a range of 20 MPa to 60 MPa. The thermal conductivity of the foam concrete can be 0.40 W/mK. The weight of the foam concrete can be in a range of 1525 kg/m$^3$ to 1650 kg/m$^3$. The cement can comprise at least 50 wt % of the constituents of the foam concrete, based on the weight of the foam concrete.

In other alternate embodiments, the constituents of the foam concrete can include:

the cement in an amount of 53 wt % to 56 wt % of the constituents of the foam concrete;

the sand in an amount of 5 wt % to 8 wt % of the constituents of the foam concrete;

the coarse aggregate in an amount of 10 wt % to 12 wt % of the constituents of the foam concrete;

the oil ash in an amount of 3 wt % to 6 wt % of the constituents of the foam concrete;

the water in an amount of 21 wt % to 25 wt % of the constituents of the foam concrete; and the foam solution in an amount of 0.5 wt % to 3.0 wt % of the constituents of the foam concrete, each based on the weight of the foam concrete.

In yet other alternate embodiments, the constituents of the foam concrete can include:

the cement in an amount of 53.4 wt % of the constituents of the foam concrete;

the sand in an amount of 5.3 wt % of the constituents of the foam concrete;

the coarse aggregate in an amount of 10.6 wt % of the constituents of the foam concrete;

the oil ash in an amount of 5.3 wt % of the constituents of the foam concrete;

the water in an amount of 24.6 wt % of the constituents of the foam concrete; and the foam solution in an amount of 0.8 wt % of the constituents of the foam concrete, each based on the weight of the foam concrete.

In an alternate embodiment of this disclosure, a foam concrete has constituents that include:

a cement in an amount of 15 wt % to 65 wt % of the constituents of the foam concrete;

a sand in an amount of 1 wt % to 10 wt % of the constituents of the foam concrete;

a coarse aggregate in an amount of 10 wt % to 50 wt % of the constituents of the foam concrete;

an oil ash in an amount of 3 wt % to 10 wt % of the constituents of the foam concrete;

a water in an amount of 10 wt % to 30 wt % of the constituents of the foam concrete; and a foam solution in an amount of 0.5 wt % to 5.0 wt % of the constituents of the foam concrete.

In alternate embodiments, the foam concrete can have a compressive strength of at least 20 MPa, a thermal conductivity of less than 0.41 W/mK and a maximum weight of 1650 kg/m$^3$. The cement can comprise at least 50 wt % of the constituents of the foam concrete, based on the weight of the foam concrete. The cement and the water together can comprise 75 wt % to 80 wt % of the constituents of the foam concrete, based on the weight of the foam concrete.

In another alternate embodiment of this disclosure, a method of disposing of an oil ash by forming a foam concrete includes the steps of mixing together the following constituents: a cement; a sand; a coarse aggregate; an oil ash; and a water. A foam solution can be added to arrive at the foam concrete that has a compressive strength of at least 20 MPa, a thermal conductivity of less than 0.41 W/mK and a maximum weight of 1650 kg/m$^3$.

In alternate embodiments, the foam concrete can be cured with the application of water at ambient pressure. The cement and the water together can comprise 75 wt % to 80 wt % of the constituents of the foam concrete, based on the weight of the foam concrete. The foam concrete can be free of fly ash, plasticizers and fiber. The cement can comprise at least 50 wt % of the constituents of the foam concrete, based on the weight of the foam concrete.

In other alternate embodiments, the constituents of the foam concrete can include:

the cement in an amount of 53 wt % to 56 wt % of the constituents of the foam concrete;

the sand in an amount of 5 wt % to 8 wt % of the constituents of the foam concrete;

the coarse aggregate in an amount of 10 wt % to 12 wt % of the constituents of the foam concrete;

the oil ash in an amount of 3 wt % to 6 wt % of the constituents of the foam concrete;

the water in an amount of 21 wt % to 25 wt % of the constituents of the foam concrete; and the foam solution in an amount of 0.5 wt % to 3.0 wt % of the constituents of the foam concrete, each based on the weight of the foam concrete.

In yet other alternate embodiments, the constituents of the foam concrete can include:

the cement in an amount of 53.4 wt % of the constituents of the foam concrete;

the sand in an amount of 5.3 wt % of the constituents of the foam concrete;

the coarse aggregate in an amount of 10.6 wt % of the constituents of the foam concrete;

the oil ash in an amount of 5.3 wt % of the constituents of the foam concrete;

the water in an amount of 24.6 wt % of the constituents of the foam concrete; and the foam solution in an amount of 0.8 wt % of the constituents of the foam concrete, each based on the weight of the foam concrete.

BRIEF DESCRIPTION OF THE DRAWINGS

So that the manner in which the above-recited features, aspects and advantages of the embodiments disclosed, as well as others that will become apparent, are attained and can be understood in detail, more particular description of the disclosure briefly summarized above can be had by reference to the embodiments that are illustrated in the drawings that form a part of this specification. It is to be noted, however, that the appended drawings illustrate some embodiments of the disclosure and are, therefore, not to be considered limiting of the disclosure's scope, for the disclosure can admit to other equally effective embodiments.

The FIGURE is a graph showing the bottom and top temperatures over time of a foam concrete slab in accordance with an embodiment of this disclosure.

DETAILED DESCRIPTION OF THE DISCLOSURE

Compositions and methods described in this disclosure provide for a foam concrete with constituents that include a cement, a sand, a coarse aggregate, an oil ash, a water, and a foam solution.

Oil ash ("OA") is a residue resulting from the combustion of heavy oil or cracked oil. Heavy oil is generally defined as fuel oil having relatively long hydrocarbon chains such as, for example, carbon lengths of between about 12-70 carbon atoms or between about 20-70 carbon atoms. Heavy fuel oil can be classified as "No. 5 fuel oil" or "No. 6 fuel oil" as classified by the American Society for Testing and Materials (ASTM). Due to its high viscosity, heavy fuel oil is sometimes preheated before combustion in, for example, a power generation plant.

Cracking, in the oil refining industry, generally refers to breaking down complex organic molecules into simpler molecules by breaking the long-chain hydrocarbons into shorter hydrocarbon chains. Various processes can be used to crack oil including, for example, catalytic processes. After the cracking process, the resultant hydrocarbons can be separated into various types of fuel, including, for example, fuel gas, liquefied petroleum gas, gasoline, light cycle oils, and heavy fuel oil. The heavy fuel oil produced by the cracking process can be referred to as "cracked fuel oil." For purposes of this application, cracked fuel oil and heavy fuel oil are both referred to as a heavy oil, unless otherwise specified. Electricity production plants and water desalination plants can use heavy oil and are expected to use increasing quantities of heavy oil in the future. Combustion of heavy oil produces residue, including ash. As one of ordinary skill will appreciate, the oil ash can, and to some extent must, due to environmental restrictions, be captured rather than being released into the atmosphere.

OA is a black powder type of waste material that results from burning of heavy oil. OA has unique characteristics compared to other types of ash. OA is collected in the electrostatic precipitators, which are installed on boilers burning residual oil, for air pollution control. The current practice for the disposal of OA is through burying it in special lined and sealed pits which is very costly and requires large area to be reserved as dumping sites.

Typically, OA includes more than about 90% by weight carbon. The remaining less than about 10% by weight of the OA can frequently include sulfur, magnesium, and vanadium. OA can include various particle sizes. In one embodiment, about 16% by weight of the OA is retained on a #325 sieve, while about 84% by weight of the material passes through the #325 sieve. This indicates that about 84% by weight of the ash can be finer than about 45 micrometers. In an alternate embodiment, about all of the OA passes through a #200 sieve. This indicates that about all of the ash can be finer than about 75 micrometers. As used herein, the term "about" is understood to include values that are within 5% of the stated value.

The scanning electron microscopic studies indicated OA to be a conglomerate of spherical balls of varying diameters. The energy dispersive X-ray analysis indicated the presence of mainly carbon, followed by sulfur and traces of magnesium and silica.

OA can contain various elements. For example, Table 1 presents an example chemical analysis of OA. The amounts of each element can vary depending upon the source of the OA.

TABLE 1

Elemental composition of one embodiment of OA

| Element | Weight, % (Range) |
| --- | --- |
| Carbon | 90-95 |
| Magnesium | 0.50-1.00 |
| Silicon | 0.05-0.10 |
| Sulfur | 5-6 |
| Vanadium | 0.5-1.0 |

Table 2 presents an example compound composition of OA. The amounts of each compound can vary depending upon the source of the OA.

TABLE 2

| Parameter | Weight, % (Range of Values) |
| --- | --- |
| $SiO_2$ | 1-2 |
| CaO | 0.4-1.0 |
| $Al_2O_3$ | <0.10 |
| $Fe_2O_3$ | 0.4-0.5 |
| MgO | 0.4-0.6 |
| $K_2O$ | 0.01-0.04 |
| $Na_2O$ | 0.5-1.0 |
| $V_2O_5$ | 2.0-3.0 |
| Sulfur | 5-10 |

TABLE 2-continued

| Parameter | Weight, % (Range of Values) |
|---|---|
| $Na_2O + (0.658K_2O)$, % | 0.3-0.6 |
| Loss on ignition | 55-65 |
| Moisture % | 5-10 |
| Fineness (Material retained on # 325 sieve) | 80-90 |

The elemental and compound composition of the OA used in embodiments of the present disclosure is substantially different from that of traditional fly ash that has been previously used in concrete.

Unlike OA, traditional fly ash is generally produced by burning coal. The main chemical components of the traditional fly ash are silicon dioxide ($SiO_2$), calcium oxide (CaO), aluminum oxide ($Al_2O_3$), and iron oxide ($Fe_2O_3$) and it is in accordance with ASTM C618. Fly ash is generally categorized depending on the type of coal burned. For example, class F fly ash is produced by burning anthracite and bituminous coal, while Class C fly ash is produced by burning lignite or sub-bituminous coal. Since fly ash contains silica, it reacts with lime produced during the hydration of cement thus making the cement dense and impermeable, whereas, OA is mainly carbon, it cannot contribute to the formation of supplementary cement. However, due low density, OA can be used to replace heavy constituents in concrete, such as cement and aggregate, particularly sand, to produce lightweight concrete. In addition, the use of OA was shown to provide improved compressive strength compared to the use of fly ash. OA is more readily available in regions where fuel oil is burned. Embodiments of this disclosure are free of fly ash.

Concrete is a composition made from cement, water, and aggregate or aggregates. While "aggregate" can be plural, the term "aggregates" generally refers to more than one type or more than one size of aggregate. Cement is a binder that can bind the aggregates together. Ordinary Portland cement ("OPC") is one such binder that can bind to other materials, such as fine and coarse aggregates, thereby holding them together. A material that is a paste that can harden to bind materials together, in the manner of cement, is said to be a cementitious material or to have cementitious properties. One of skill in the art will appreciate that water can be added to dry cement to make cement paste. The water-cement ratio ("w/c ratio") of OPC is typically between about 0.20 and 0.5. By way of explanation, a w/c ratio of 0.20 indicates that there is one part water to five parts Portland cement (1/5=0.20). A w/c ratio of 0.5 indicates one part water to two parts cement. The cement of embodiments of this disclosure can be, for example, a Type I Portland Cement. However, any type of cement, including a pozzolanic cement, can be used to produce lightweight concrete developed in this disclosure. In certain embodiments, pozzolanic material can alternately be used as a filler.

As one of ordinary skill will appreciate, various types of conventional aggregates can be used as a filler in the concrete. As one of skill in the art will appreciate, the term "aggregates" can refer to aggregate of multiple types or sizes. Aggregate can include, for example, sand, gravel, crushed rock, slag, or any other type of aggregate. When aggregate is used in concrete, the cement generally coats the aggregates and then binds them together in a matrix. When aggregates of various sizes are used, the smaller aggregate materials can fill voids between the larger aggregate materials, thus creating a denser matrix. The aggregates used in concrete can be defined in terms of coarse aggregate and fine aggregate. Fine aggregates, also referred to as "fines," can include natural sand, crushed stone, or other suitable fine particles, with most particles smaller than 5 mm. Coarse aggregates generally include gravel or crushed stone with particles predominantly larger than 5 mm and typically between 9.5 mm and 37.5 mm.

A foam solution can be used such as a commercially available foaming agent that forms a solution when mixed with water. One such commercially available foaming agent is EABASSOC Foaming Agent available through E-A-B Associates. Other commercially available foaming agents can alternately be used, and in each case, prepared in accordance with vendor instructions. As an example, compressed air can be introduced in the foaming agent plus water to form foam. The water mixed with the foaming agent to form the foam solution is separate from the amount of water used as a separate constituent of the foam concrete, as described in this disclosure. In this specification, the water used to mix with the foaming agent to form a foam solution will be referred to as foam water.

In preparing the foam concrete the range of wt % each of the constituents, which include a cement, a sand, a coarse aggregate, an oil ash, a water, and a foam solution, can be found in Table 3. As used in this disclosure, the unit wt % is measured relative to the weight of the foam concrete.

TABLE 3

| Constituent | Possible range wt % |
|---|---|
| Cement | 15 to 65 |
| Sand | 1 to 10 |
| Coarse aggregate | 10 to 50 |
| Oil ash | 3 to 10 |
| Water | 10 to 30 |
| Foam solution | 0.5 to 5 |

In certain embodiments, the cement is at least 50 wt % of the constituents of the foam concrete, based on the weight of the foam concrete. For example, in certain embodiments, the cement can make up 53 wt % to 56 wt % of the constituents of the foam concrete. In determining the ratios of the constituents, the combination of water and cement can make up 75 wt % to 80 wt % of the constituents of the foam concrete, based on the weight of the foam concrete. Both water and cement are required to form a paste that can easily bind the aggregate.

In alternate embodiments, the wt % of each of the constituents can be within other ranges. For example, the sand can be 5 wt % to 8 wt % of the constituents of the foam concrete. In certain embodiments, the coarse aggregate can be in an amount of 10 wt % to 12 wt % of the constituents of the foam concrete. In certain embodiments the oil ash can be in an amount of 3 wt % to 6 wt % of the constituents of the foam concrete. In certain embodiments the water can be in an amount of 21 wt % to 25 wt % of the constituents of the foam concrete. In certain embodiments the foam solution can be in an amount of 0.5 wt % to 3.0 wt % of the constituents of the foam concrete. The foam concrete is free of fly ash, plasticizers and fiber. There is no need to add plasticizer since the foam concrete will be a semi-liquid form and it can be easily placed. The presence of fibers will hinder the formation of foam concrete. Therefore, plasticizers and fiber materials do not provide an advantage to the foam concrete and will increase the cost of the resulting product.

The resulting foam concrete is a lightweight concrete product that can be used as an insulating and structural load bearing member. For example, the compressive strength of a concrete product formed in accordance with this disclosure can have a compressive strength of at least 20 MPa, and can be in a range of 20 MPa to 60 MPa, can have a thermal conductivity of less than 0.41 W/mK, such as 0.40 W/mK, and can have a maximum weight of 1650 kg/m3 with a range of 1525 kg/m³ to 1650 kg/m³.

In order to form the foam concrete, the cement, the sand, the coarse aggregate, the oil ash, and the water can be mixed in the usual manner. The foam solution can be prepared and added to the other pre-mixed constituents to arrive at the foam concrete. The foam concrete can be cured with the application of water at ambient pressure. For example, the foam concrete can be cured by water immersion, ponding, fogging or wet covering. In certain embodiments, water ponding can be performed by forming dykes around the foam concrete member so that a layer of water is maintained on the foam concrete member over the duration of the curing time period.

EXAMPLES

Several trial mixtures of foam concrete were prepared. The weights of the mixture constituents in the trial mixtures are shown in Table 4.

TABLE 4

| Mix # | Specimen # | Weight, grams | | | | | | (W + F)/C ratio | Compressive strength MPa | Unit weight, kg/m3 |
|---|---|---|---|---|---|---|---|---|---|---|
| | | Cement | Sand | Coarse Aggregate #8 | Oil ash | Water | Foam solution | | | |
| 1 | 1 | 500 | 50 | 100 | 50 | 200 | 25 | 0.45 | 19.80 | 1552.8 |
| | 2 | 500 | 50 | 100 | 50 | 200 | 25 | 0.45 | 19.60 | 1561.6 |
| | 3 | 500 | 50 | 100 | 50 | 200 | 25 | 0.45 | 17.82 | 1591.2 |
| 2 | 1 | 500 | 65 | 100 | 35 | 190 | 15 | 0.41 | 42.87 | 1527.2 |
| | 2 | 500 | 65 | 100 | 35 | 190 | 15 | 0.41 | 37.88 | 1572 |
| | 3 | 500 | 65 | 100 | 35 | 190 | 15 | 0.41 | 39.76 | 1527.2 |
| 3 | 1 | 500 | 65 | 100 | 35 | 190 | 10 | 0.40 | 38.95 | 1572.8 |
| | 2 | 500 | 65 | 100 | 35 | 190 | 10 | 0.40 | 39.30 | 1591.2 |
| | 3 | 500 | 65 | 100 | 35 | 190 | 10 | 0.40 | 38.13 | 1577.6 |

For the specimens shown in Table 4, the foam solution included a foaming agent in an amount that was 2% by weight the foam solution. Based on the trials an mixture was selected for detailed evaluation. The weights of constituents in the tested mixture are shown in Table 5.

TABLE 5

| Constituent | Tested Mix wt % |
|---|---|
| Cement | 53.4 |
| Sand | 5.3 |
| Coarse aggregate | 10.6 |
| Oil ash | 5.3 |
| Water | 24.6 |
| Foam water | 0.8 |

In the example of Table 5, the amount of foam agent is 1.45% by weight of foam solution. As can be calculated from the values in Table 5, the amount of oil ash is approximately 10% of the amount of cement, on a weight basis, the water to cement ratio (w/c) is 0.46, and the water plus foam to cement ratio ((w+f)/c) is 0.48.

Foam concrete slab specimens of size 250×150×50 mm were prepared for exposure to fire at about 600° C. Visual examination and photographic evidence was collected after the exposure. A comparison was made before and after the exposure to fire. The specimens were subjected to fire until the loss of structural stability, and time for the initiation of the deterioration was noted.

The FIGURE shows the temperature variation in the top and bottom surfaces of the foam concrete slab specimen. As expected, the temperature at the bottom surface (exposed to fire) is more than that on the top surface (not exposed to fire). After about two hours of exposure to fire the temperature at the top surface is almost half that on the bottom surface. This reduction in temperature between the bottom surface and the top surface is about 80% and 55% after exposure to fire for 20 and 120 minutes, respectively.

A guarded hot plate that conforms to ASTM Standard C177 was used for the measurement of thermal conductivity under steady-state heat flow conditions. The thermal conductivity measuring equipment is suitable for testing non-homogeneous materials, such as concrete, masonry, wood products, cellular plastics, etc. The accuracy of the test equipment is about ±4% of the true value of the thermal conductivity.

The test specimens of dimensions 35 cm×35 cm×5 cm were prepared and tested in the guarded hot plate. The surfaces of the specimens must be flat and parallel to minimize contact resistance between these two surfaces and the corresponding hot and cold plate surfaces. Due to the rough surfaces of the specimens it was not possible to get the flat and parallel surfaces. An uneven surface would result in a significant temperature difference between the hot plate and the corresponding specimen surface. To overcome this problem, thermocouple wires were fixed on both sides of the specimen. A multi-channel programmable data logger monitored the surface temperatures at hourly intervals. The arithmetic mean of the temperatures measured by these thermocouples on each side was used in the calculation instead of those from hot and cold surfaces of the guarded hotplate. The specimens were covered with a blanket on both sides to have smooth contact with the plate surfaces. The specimen temperatures were monitored till steady-state conditions were obtained. The thermal conductivity, k [w/m·K], for the test specimen was calculated by the following equation:

$$k = \frac{Qd}{A(T_h - T_c)}$$

Where:
Q [Watts] is the heat flow through the specimen;
d [m] is the thickness of the test specimen;
Th [° C.] is the temperature of the hot side of the test specimen;
Tc [° C.] is the temperature of the cold side of the test specimen; and
A [m$^2$] is the area of the heater.

In a separate test, three 100×100×100 mm specimens were tested in compression according to ASTM C39 in order to determine the compressive strength of the foam concrete.

The results of the tests of the tested specimens are shown in Table 6.

TABLE 6

| Test | Result |
|---|---|
| Dry unit weight kg/m$^3$ | 1,641 |
| Thermal conductivity W/m.K | 0.404 |
| 28-days compressive strength (MPa) | 40 |
| 90 Days Compressive strength (MPa) | 50 |

The tested specimen therefore has a sufficient compressive strength to be used as a structural member. Some current lightweight foam concretes have a much lower compressive strength making them unsuitable for load bearing applications. Traditional structural concretes, and concretes that include fly ash and that have a comparable compressive strength as the foam concrete of this disclosure can have a weight in the range of 2200-2400 kg/m$^3$. The foam concrete of this disclosure is significantly lower, providing a lighter weight product overall.

In addition, traditional structural concretes, and concretes that include fly ash can have a thermal conductivity of 1 to 1.8 W/m·K, which is significantly higher than the thermal conductivity of the foam concrete of this disclosure. The decrease in the unit weight and thermal conductivity of the disclosed foam concrete reduces the weight of the concrete members, leads to energy conservation, and reduces the overall cost of the infrastructure. Therefore, embodiments of this disclosure can be utilized to produce lighter concrete elements with good compressive strength and better insulation properties or structural applications and in concrete masonry units, bricks and for insulation purposes. The performance of the produced mix of this application is better than that of the conventional foam concrete in terms of strength, it is lighter than the conventional concrete, and has better thermal properties than conventional concrete.

Current types of conventional concrete that utilizes oil ash has an oil ash to cement ratio of about 5 wt %. The amount of oil ash is significantly higher, meaning embodiments of this application provide a more useful method of disposing of oil ash, which otherwise causes environmental problems.

Although embodiments of the present disclosure have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within the said range.

Throughout this application, where patents or publications are referenced, the disclosures of these references in their entireties are intended to be incorporated by reference into this application, in order to more fully describe the state of the art to which the disclosure pertains, except when these references contradict the statements made herein.

What is claimed is:

1. A foam concrete, the constituents of the foam concrete comprising:
   a cement;
   a sand;
   a coarse aggregate;
   an oil ash;
   a water; and
   a foam solution; wherein
   the foam concrete has a compressive strength of at least 20 MPa, a thermal conductivity of less than 0.41 W/mK and a maximum weight of 1650 kg/m$^3$.

2. The foam concrete of claim 1, wherein the cement and the water together comprise 75 wt % to 80 wt % of the constituents of the foam concrete, based on the weight of the foam concrete.

3. The foam concrete of claim 1, wherein the foam concrete is free of fly ash, plasticizers and fiber.

4. The foam concrete of claim 1, wherein the compressive strength of the foam concrete is in a range of 20 MPa to 60 MPa.

5. The foam concrete of claim 1, wherein the thermal conductivity of the foam concrete is 0.40 W/mK.

6. The foam concrete of claim 1, wherein the weight of the foam concrete is in a range of 1525 kg/m$^3$ to 1650 kg/m$^3$.

7. The foam concrete of claim 1, wherein the cement comprises at least 50 wt % of the constituents of the foam concrete, based on the weight of the foam concrete.

8. The foam concrete of claim 1, wherein the constituents of the foam concrete include:
   the cement in an amount of 53 wt % to 56 wt % of the constituents of the foam concrete;
   the sand in an amount of 5 wt % to 8 wt % of the constituents of the foam concrete;
   the coarse aggregate in an amount of 10 wt % to 12 wt % of the constituents of the foam concrete;
   the oil ash in an amount of 3 wt % to 6 wt % of the constituents of the foam concrete;
   the water in an amount of 21 wt % to 25 wt % of the constituents of the foam concrete; and
   the foam solution in an amount of 0.5 wt % to 3.0 wt % of the constituents of the foam concrete, each based on the weight of the foam concrete.

9. The foam concrete of claim 1, wherein the constituents of the foam concrete include:
   the cement in an amount of 53.4 wt % of the constituents of the foam concrete;
   the sand in an amount of 5.3 wt % of the constituents of the foam concrete;
   the coarse aggregate in an amount of 10.6 wt % of the constituents of the foam concrete;
   the oil ash in an amount of 5.3 wt % of the constituents of the foam concrete;

the water in an amount of 24.6 wt % of the constituents of the foam concrete; and the foam solution in an amount of 0.8 wt % of the constituents of the foam concrete, each based on the weight of the foam concrete.

10. A foam concrete, the constituents of the foam concrete comprising:
- a cement in an amount of 15 wt % to 65 wt % of the constituents of the foam concrete;
- a sand in an amount of 1 wt % to 10 wt % of the constituents of the foam concrete;
- a coarse aggregate in an amount of 10 wt % to 50 wt % of the constituents of the foam concrete;
- an oil ash in an amount of 3 wt % to 10 wt % of the constituents of the foam concrete;
- a water in an amount of 10 wt % to 30 wt % of the constituents of the foam concrete; and
- a foam solution in an amount of 0.5 wt % to 5.0 wt % of the constituents of the foam concrete.

11. The foam concrete of claim 10 wherein the foam concrete has a compressive strength of at least 20 MPa, a thermal conductivity of less than 0.41 W/mK and a maximum weight of 1650 kg/m$^3$.

12. The foam concrete of claim 10, wherein the cement comprises at least 50 wt % of the constituents of the foam concrete, based on the weight of the foam concrete.

13. The foam concrete of claim 10, wherein the cement and the water together comprise 75 wt % to 80 wt % of the constituents of the foam concrete, based on the weight of the foam concrete.

14. A method of disposing of an oil ash by forming a foam concrete, the method comprising the steps of:
- mixing together the following constituents:
  - a cement;
  - a sand;
  - a coarse aggregate;
  - an oil ash; and
  - a water;
- adding a foam solution to arrive at the foam concrete that has a compressive strength of at least 20 MPa, a thermal conductivity of less than 0.41 W/mK and a maximum weight of 1650 kg/m$^3$.

15. The method of claim 14, further including curing the foam concrete with the application of water.

16. The method of claim 14, wherein the cement and the water together comprise 75 wt % to 80 wt % of the constituents of the foam concrete, based on the weight of the foam concrete.

17. The method of claim 14, wherein the foam concrete is free of fly ash, plasticizers and fiber.

18. The method of claim 14, wherein the cement comprises at least 50 wt % of the constituents of the foam concrete, based on the weight of the foam concrete.

19. The method of claim 14, wherein the constituents of the foam concrete include:
- the cement in an amount of 53 wt % to 56 wt % of the constituents of the foam concrete;
- the sand in an amount of 5 wt % to 8 wt % of the constituents of the foam concrete;
- the coarse aggregate in an amount of 10 wt % to 12 wt % of the constituents of the foam concrete;
- the oil ash in an amount of 3 wt % to 6 wt % of the constituents of the foam concrete;
- the water in an amount of 21 wt % to 25 wt % of the constituents of the foam concrete; and
- the foam solution in an amount of 0.5 wt % to 3.0 wt % of the constituents of the foam concrete, each based on the weight of the foam concrete.

20. The method of claim 14, wherein the constituents of the foam concrete include:
- the cement in an amount of 53.4 wt % of the constituents of the foam concrete;
- the sand in an amount of 5.3 wt % of the constituents of the foam concrete;
- the coarse aggregate in an amount of 10.6 wt % of the constituents of the foam concrete;
- the oil ash in an amount of 5.3 wt % of the constituents of the foam concrete;
- the water in an amount of 24.6 wt % of the constituents of the foam concrete; and
- the foam solution in an amount of 0.8 wt % of the constituents of the foam concrete, each based on the weight of the foam concrete.

\* \* \* \* \*